(12) United States Patent
Reid et al.

(10) Patent No.: US 7,787,330 B1
(45) Date of Patent: Aug. 31, 2010

(54) REMOVABLE PROTECTIVE DEVICE FOR A SUBMERSIBLE LIQUID TRANSMITTER

(76) Inventors: Karl Reid, 858 E. 400 South, Smithfield, UT (US) 84335; Kyle Yost, 2164 N. 800 E., North Logan, UT (US) 84321; Rick Lester, 2669 Broadmoor St., Simi Valley, CA (US) 93065

( * ) Notice: Subject to any disclaimer, the term of this patent is extended or adjusted under 35 U.S.C. 154(b) by 0 days.

(21) Appl. No.: 11/906,719

(22) Filed: Oct. 3, 2007

(51) Int. Cl.
*G10K 11/00* (2006.01)
(52) U.S. Cl. ................................. 367/173; 367/141
(58) Field of Classification Search ................ 367/141, 367/169, 173; 73/649, 290 R, 290 V
See application file for complete search history.

(56) References Cited

U.S. PATENT DOCUMENTS

| | | |
|---|---|---|
| 2,404,375 A | 7/1946 | Harry |
| 2,636,964 A | 4/1953 | Lancor et al. |
| 3,227,996 A | 1/1966 | Hayward et al. |
| 3,663,933 A | 5/1972 | Madison |
| 3,725,856 A | 4/1973 | Chervenak |
| 5,268,879 A | 12/1993 | Flanagan |
| 5,658,534 A * | 8/1997 | Desborough et al. ........ 367/159 |
| 5,771,205 A * | 6/1998 | Currier et al. ............... 367/173 |
| D403,606 S | 1/1999 | Paton, Jr. |
| 6,094,402 A * | 7/2000 | Cooper et al. ............... 367/188 |

OTHER PUBLICATIONS

Blue Ribbon Sales & Service; website: http://www.blueribboncorp.com/birdcage.html.
Blue Ribbon Birdcage Spec. Sheet.

* cited by examiner

*Primary Examiner*—Ian J Lobo
(74) *Attorney, Agent, or Firm*—Jones Waldo Holbrook & McDonough

(57) ABSTRACT

A removable protective device for a submersible liquid level transmitter and method for using the same. The protective device includes a sensor cage assembly having a sensor component and a cage component. The cage component can include a bottom plate and a top plate coupled to the bottom plate through a plurality of spacers. The device includes a seat, located on a top surface of the top plate, and a securing mechanism capable of removably securing the sensor in the seat, and thus to the protective cage.

12 Claims, 8 Drawing Sheets

REMOVABLE PROTECTIVE DEVICE FOR A SUBMERSIBLE LIQUID TRANSMITTER

BACKGROUND

Submersible liquid level transmitters are used in a variety of industries and applications. For example, it is often necessary to know liquid levels in cooling towers, water storage tanks, sewer systems, dam reservoirs, rivers, lakes, sewer treatment plants, accumulation pools, water towers, sand filter ponds in sewage treatment plants, sewer lift stations (which incorporate a well to serve as a storage buffer for sanitary as well as storm sewage), etc. In such situations, a sensor is lowered into the liquid being monitored. The sensor is typically coupled by a length of cable to a processor. The processor is often a programmable controller or a dedicated controller that takes the reading from the sensor (e.g. a PT-500 sensor could measure water level) and from other inputs, switches, sensors, selectors, etc. Based on the data received, the processor determines (according to its programming) what outputs (such as a pump motor) to turn on and the duration of operation. The processor will likely have alarm conditions set, such as water level being too high, or the pump operating for too long, and send messages when those alarm conditions are met, such alarms notify operators that human intervention is required.

Examples of suitable processors include, but are not limited to, Lift Plus pump lift station control panel manufactured by Wastech Controls & Engineering, Inc. (Chatsworth, Calif.); Total Control Unit (T2000-AD) pump controller manufactured by Open Control Solutions (Melbourne, Fla.); and pump control systems manufactured by Quality Manufacturing Company (Roanoke, Va.).

The submersible sensors typically have a very thin membrane or diaphragm on their bottom end, that is the primary sensory component in detecting liquid levels. However, as can be appreciated, the sensors are often placed in extreme and often harsh conditions. For example, there may be significant turbulence in the liquid being monitored. Additionally, solid levels inside the containers being monitored can interfere with the sensors. Therefore, cages are often employed to shield the sensors from conditions and materials that would either damage the membranes or interfere with their sensory capabilities.

Current cage and sensor assemblies are not totally effective at solving the problems identified above. For example, the components—i.e. the sensor component and the cage component—do not always have the same lifespan. For example, in some instances, the cage will become defective, but the sensor remains functional. More often, the sensors cease working, while the cages are in perfect working order. In either case, it is extremely inefficient, and wasteful and expensive to replace the entire assembly whenever a single component wears out.

This and other problems found in the prior art are solved by the present invention.

SUMMARY

Additional features and advantages of the invention will be set forth in the detailed description which follows, taken in conjunction with the accompanying drawings, which together illustrate by way of example, the features of the invention.

The present invention is a removable protective device for a submersible liquid level transmitter. The removable protective device includes a sensor cage assembly, including a sensor component and a cage component. The cage component includes a bottom plate and a top plate coupled to the bottom plate through a plurality of spacers. There is a seat located on a top surface of the top plate and a securing mechanism capable of removably securing the sensor in the seat.

In some embodiments, the seat is one or more screws situated approximately radially around a substantially central hole in the top plate. These screws can be tapered headed screws. In some embodiments, they can be cap-head screws. The seat could also be made up of screws, rivets, machined parts, or combinations thereof, situated approximately radially around a substantially central hole in the top plate.

In one embodiment, the securing mechanism is a C-ring. In yet other embodiments, the sensor comes pre-equipped with the C-ring. One type of sensor suitable for use with the present invention in its various embodiments is a hydrostatic pressure level sensor.

The top plate can further include a central hole having a ledge on which the sensor rests. In some embodiments, the ledge is a continuous ridge smaller in diameter than the central hole, and smaller in diameter than a bottom surface of the sensor. In other embodiments, the ledge is to two or more outcroppings around the perimeter of the central hole.

A method of removably attaching a sensor to a protective cage is also disclosed. First a protective cage is provided. The protective cage includes a bottom plate and a top plate coupled to the bottom plate through a plurality of spacers. The top plate further includes a central hole having a ledge on which the sensor rests, and a seat located adjacent to the central hole. The user would situate the sensor on the ledge of the central hole, and place a securing mechanism over the sensor. The securing mechanism would then be engaged with the seat, whereby the sensor is held on to the ledge and thus removably attached to the protective cage.

DETAILED DESCRIPTION OF THE ILLUSTRATED INVENTION

Figure 1:
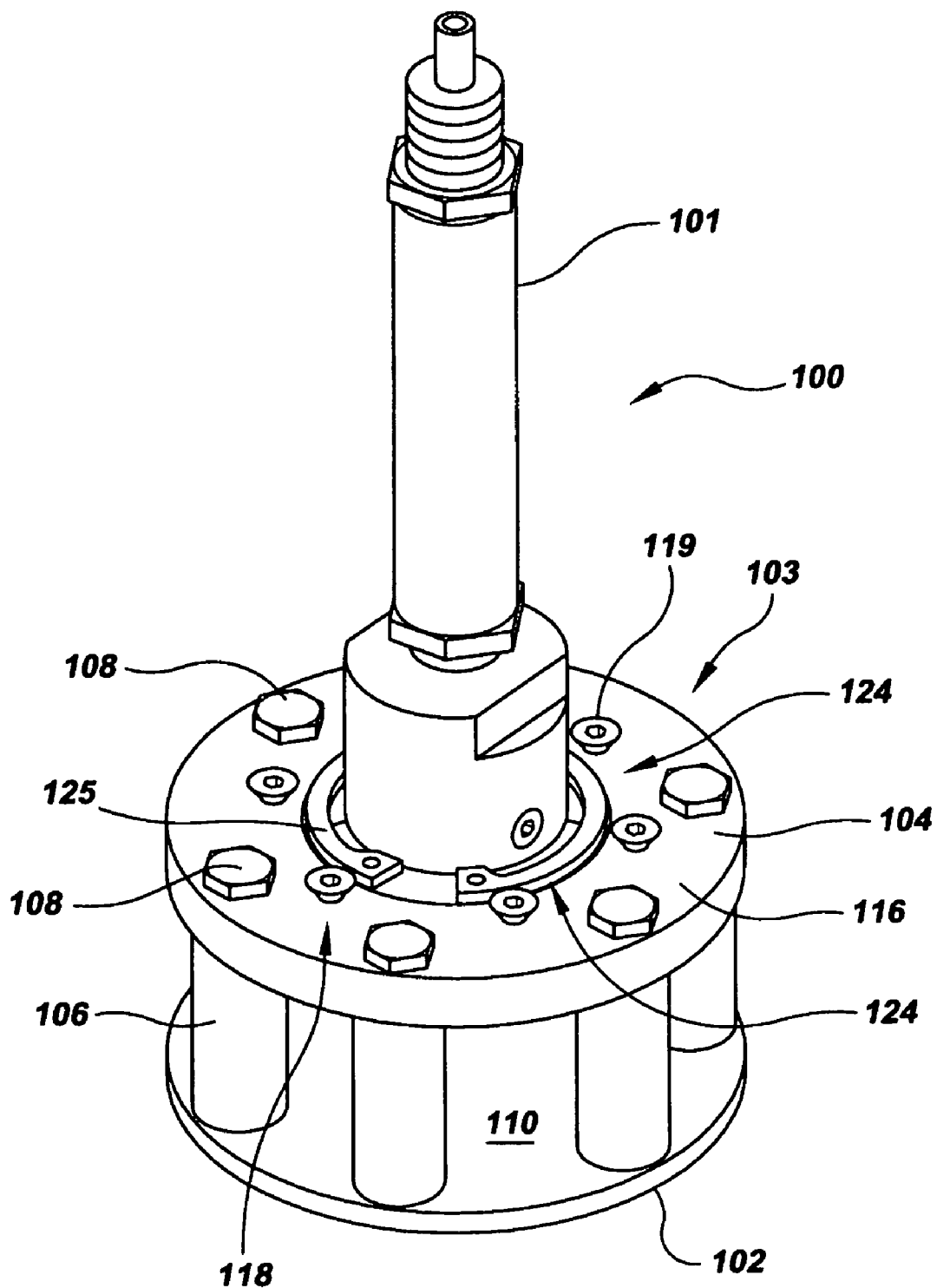
FIG. 1 shows a removable protective device for a submersible liquid level transmitter according to one embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Referring to FIG. 1, there is shown a sensor cage assembly 100 according to one embodiment of the present invention. The cage assembly 100 includes a sensor component 101 as well as a cage component 103. The sensor in this particular embodiment is an off-the-shelf hydrostatic pressure level sensor, available from Automation Products Group, Inc. (Logan, Utah). Other sensors would also be suitable for use with the present invention, including, but not limited to Type S-10.3A sensors manufactured by Wika Instrument Corporation (Lawrenceville, Ga.); and FS Series sensors from Dylix Corporation (Grand Island, N.Y.). It is also noted that certain models of sensors—while they may not be immediate usable off the shelf, can be adapted for use with the present invention by being fitted with an appropriate sanitary fitting (which is an industry standard size).

The cage component includes a bottom plate 102. The bottom plate 102 in this embodiment is circular. The circular configuration has functional advantages. For example, in certain applications of the sensor, it may be undesirable to have corners or sharp edges on the cage as they could potentially damage the container in which they are placed. However, in applications where corners and sharp edges are not a concern, the bottom plate 102 could be any number of shapes including, but not limited to, square, rectangular, oval, or any number of shapes that would be apparent to one skilled in the art. A top plate 104 is coupled to the bottom plate 102 through a plurality of spacers 106. In this embodiment, the spacers 106 are hollow cylindrical columns through which a bolt 108 can be placed.

Figure 2:
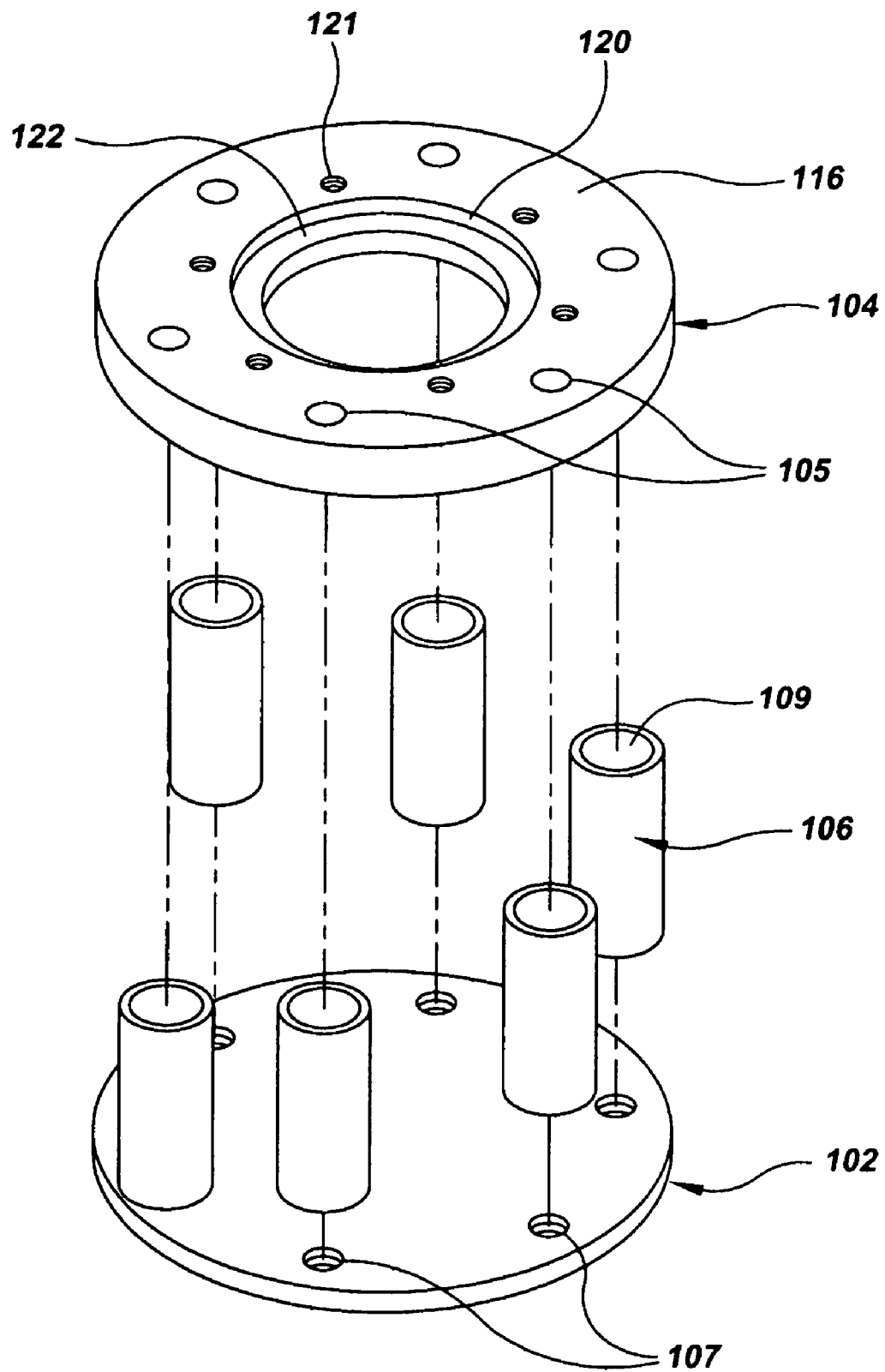
FIG. 2 shows a partially assembled cage component according to one embodiment of the present invention.
Figure 3:
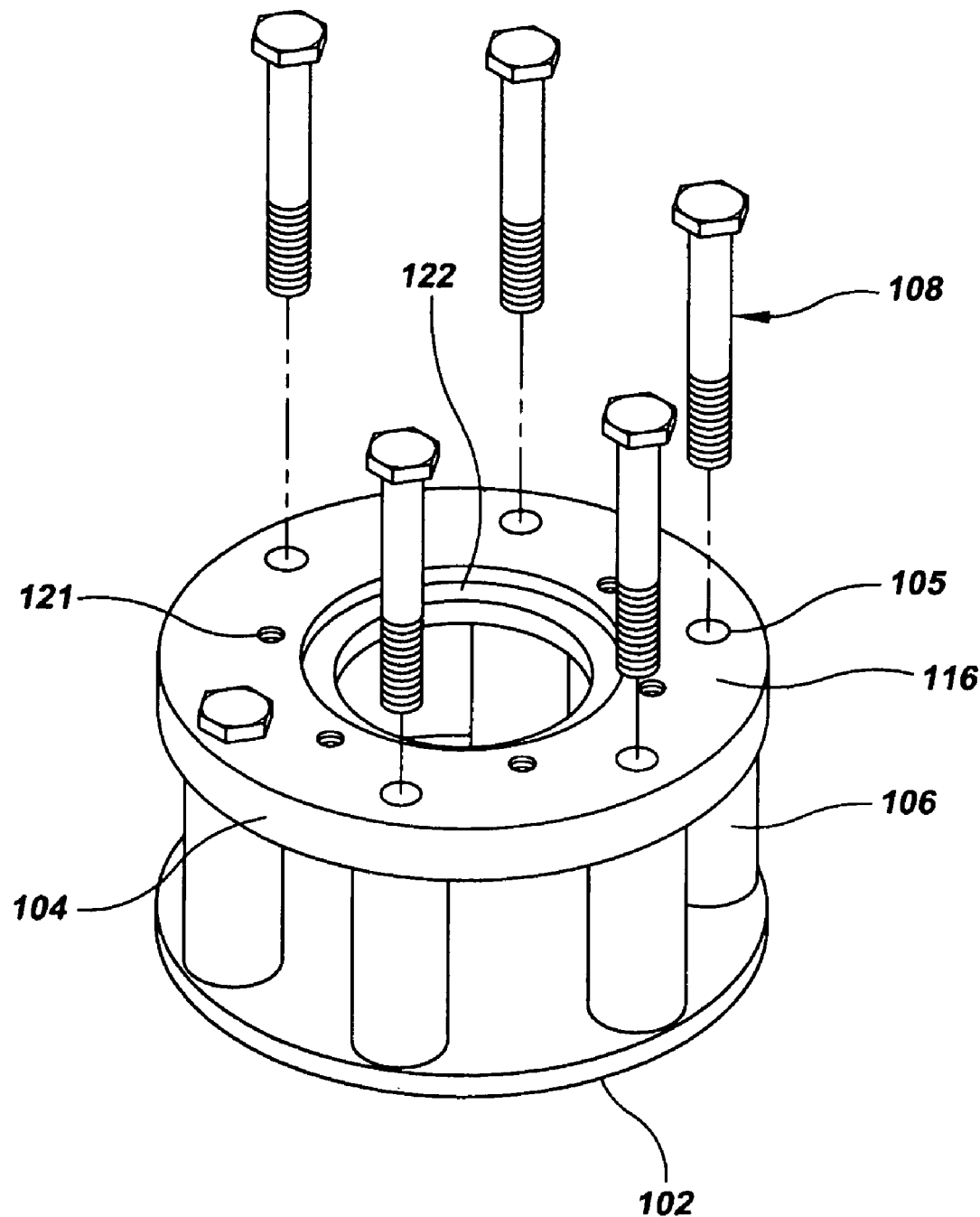
FIG. 3 shows another partially assembled cage component according to one embodiment of the present invention.
Figure 4:
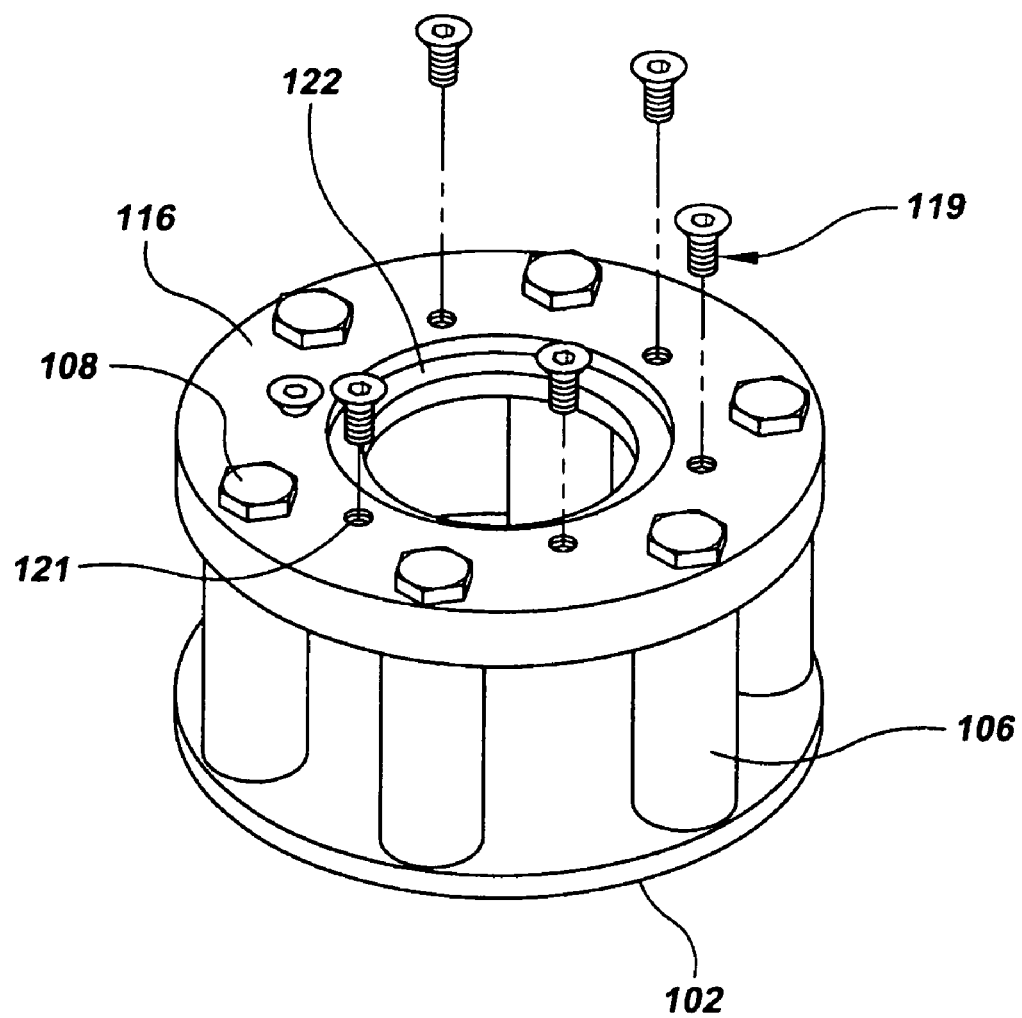
FIG. 4 shows yet another partially assembled cage component according to one embodiment of the present invention.

Referring to FIGS. 2 and 3, the top plate 104 includes holes 105—which can either be threaded or unthreaded—that correspond to holes 107 (FIG. 2) in the bottom plate 102—also threaded or unthreaded. Thus, in assembling the sensor cage 100, one would align the holes of the top plate 104 with the hollow centers 109 of the spacers 106. Similarly, the hollow centers 109 of the columns 106 would be aligned with the corresponding holes 107 on the bottom plate 102.

In this embodiment, the holes 105 in the top plate 104 are unthreaded, and the holes 107 in the bottom plate 102 are threaded. Thus, as seen best in FIG. 3, the bolts 108 are directed through the holes 105 in the top plate 102, through the hollow centers 109 of the spacers 106, and then screwed into the threaded holes 107 in the bottom plate 102.

Figure 5:
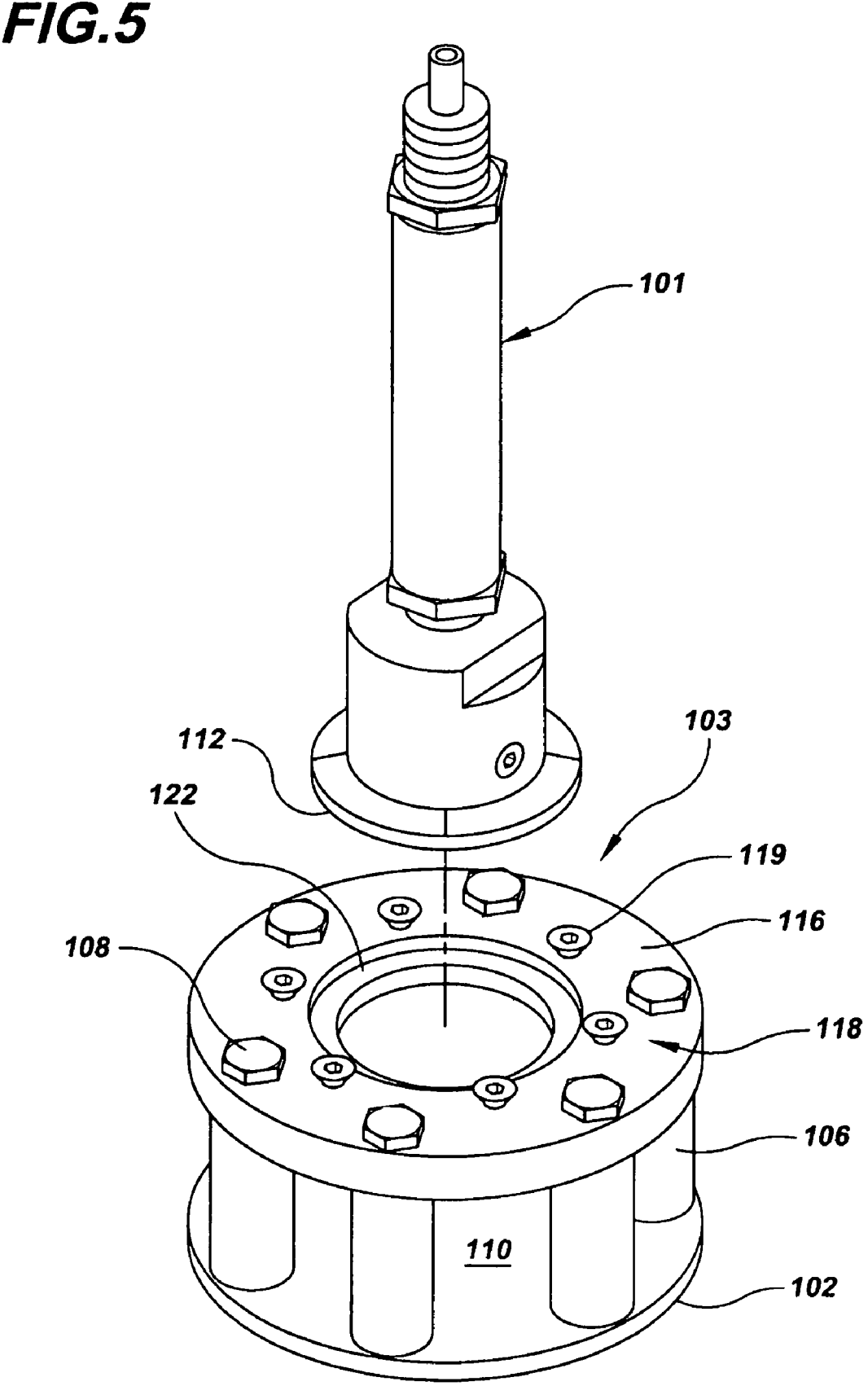
FIG. 5 shows an assembled cage component according to one embodiment of the present invention.

It is noted that, as with the bottom plate 102, the top plate 104 could be any number of shapes that would be apparent to one skilled in the art. However, as with the bottom plate 102, in at least some embodiments, the rounded configuration is useful because corners or sharp edges can be undesirable. Another reason the top and bottom plates 104, 102 are circular is because given the circular shape of the bottom of the sensor 112 (FIG. 5), a round cage 103 is space-efficient (i.e. there are no extraneous corners, edges, etc. which require more materials and therefore more expense). Also, such a circular configuration can be more compact and therefore take up less room in the container in which the sensor cage assembly 100 is placed.

Spacers 106 in this embodiment are cylindrical. However, as would be apparent to one skilled in the art, the spacers could be any number of shapes. For example, rather than being cylindrical, they could have one or more flat surfaces (e.g. they could be square in cross-section). Spacers 106 could also be varying heights. The space 110 between the top and bottom plates 104, 102 needs to be sufficient to allow the liquid to interact with the bottom surface 112 of sensor 101. However, as would be apparent to one skilled in the art, the actual amount of space 110 required can vary depending on the specific application in which the sensor cage assembly 100 is being used.

On the top surface 116 of the top plate 104, is a seat 118 into which sits a securing mechanism 124. In this embodiment the seat 118 is one or more tapered headed screws 119 situated approximately radially around the substantially central hole 120 in the top plate 104, and which screw into threaded holes 121. The seat 118 could have other configurations that would be considered within the scope of the present invention. For example, in some instances, one could use fewer screws 119. In other embodiments, instead of tapered screws, one could use cap-head screws. The seat 118 could also be constructed of numerous other types of screws, rivets, or other machined parts, or combinations thereof. In short, the seat 118 of the present invention in its various embodiments could be virtually any mechanism that can provide a recessed or notched area where the securing mechanism (which in this embodiment is a C-ring 125) can expand, thus clamping the sensor 101 into place by the spring force of the C-ring 125.

However, it is noted that the taper headed screw can be particularly advantageous because it is relatively low cost, and the taper on the head uses the spring force of the ring to push itself down, making it self seating. Thus, by utilizing taper headed screws, the tolerances on the part do not need to be as tight, making manufacture and assembly easier.

As seen in FIGS. 2-5, the central hole 120 includes a ledge 122 on which the edge of the bottom surface 112 of the sensor 101 rests. It is noted that in this embodiment, the central hole 120 is a first bore, and the ledge 122 is a counter-bore. The counter-bore creates a continuous ridge having an inner diameter slightly smaller than the diameter of the central hole 120, and slightly smaller than the diameter of the bottom surface 112 of the sensor 101.]

However, in certain embodiments, the ledge 122 could be small outcroppings at several locations around the central hole 120. In short, the ledge is intended to include any number of support mechanisms that would be apparent to one skilled in the art that cause the bottom surface 112 of the sensor 101 to be seated concentric to the central hole 120.

Figure 6:
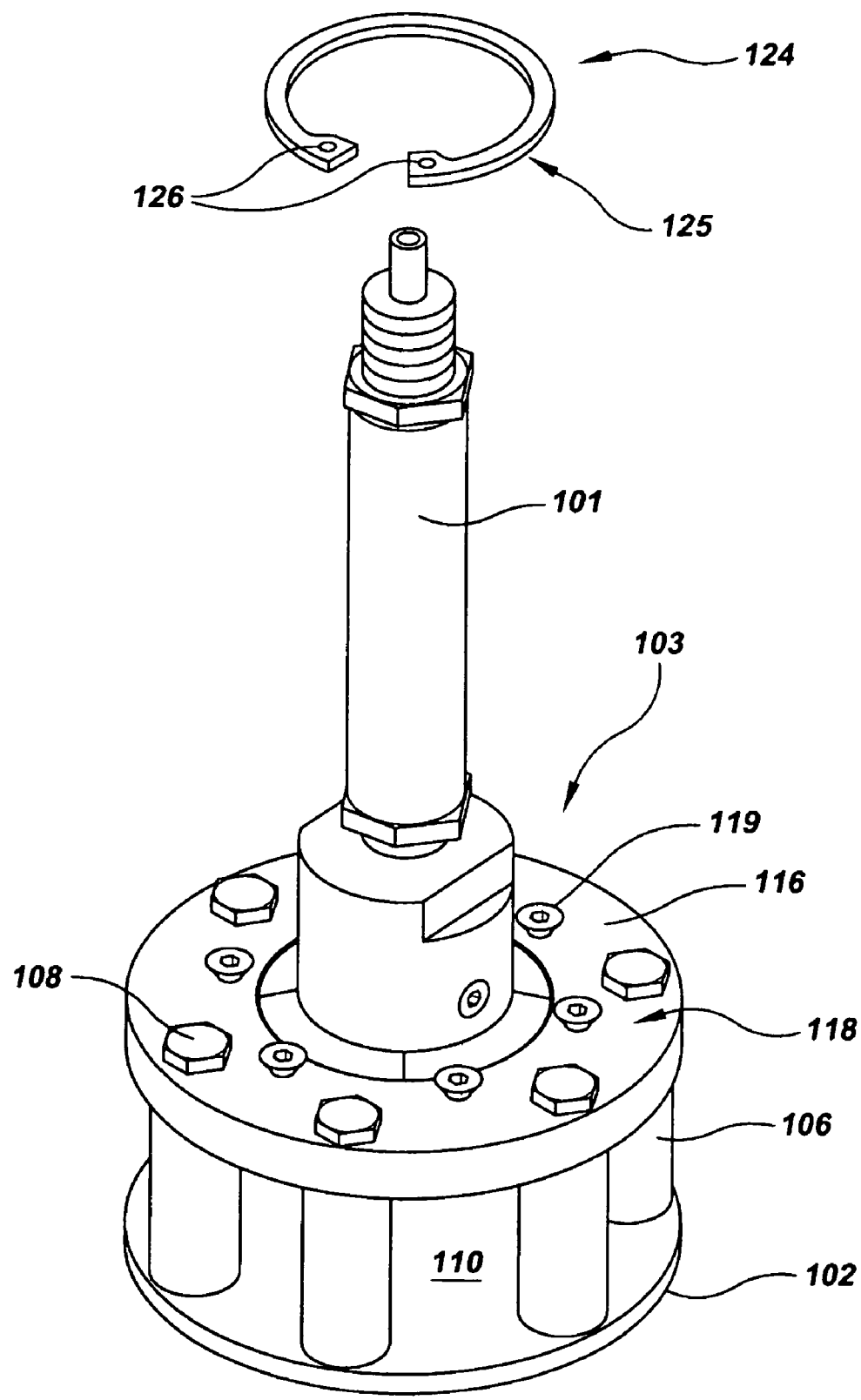
FIG. 6 shows an assembled cage component according to one embodiment of the present invention, with the sensor component inserted.
Figure 7:
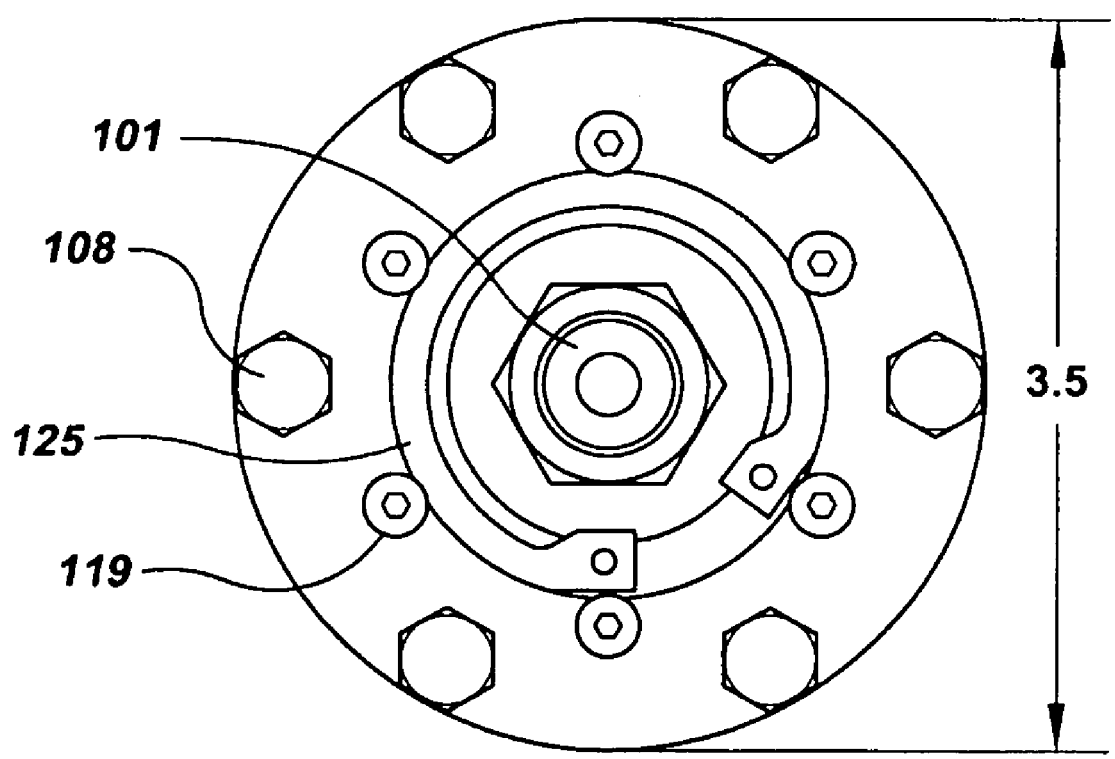
FIG. 7 shows a top view of a sensor and cage component assembly according to one embodiment of the present invention.
Figure 8:
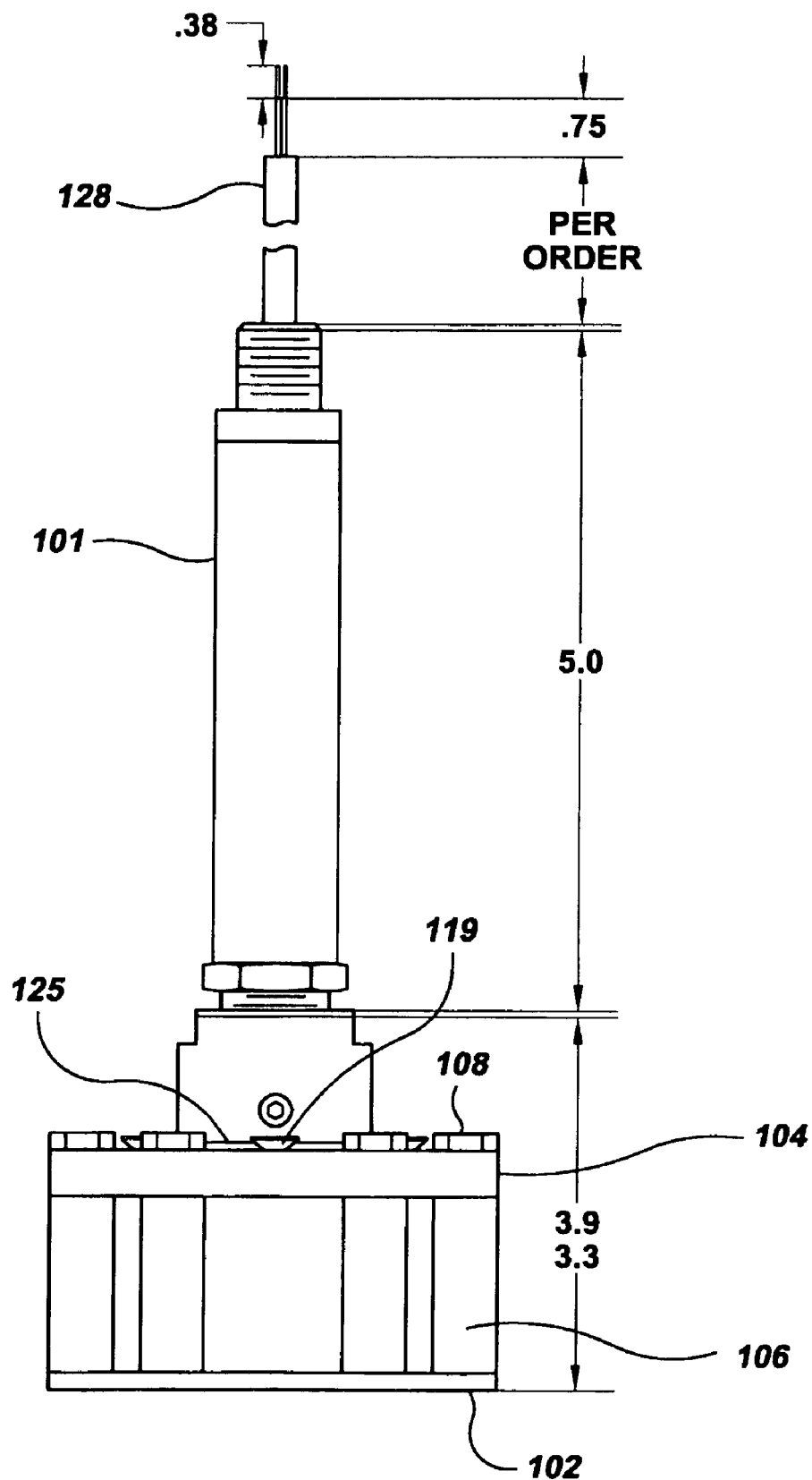
FIG. 8 shows a side view of the sensor and cage component assembly of FIG. 7.

Referring to FIG. 6, once the sensor 101 is seated into the cage 103, the securing mechanism 124 is added to secure the sensor 101 to the cage 103. In this embodiment, the securing mechanism 124 is a C-ring or C-shaped snap ring 125. The C-ring 125 includes two grasping areas 126, which in this case are just holes in the ends of the C-ring 125. In operation, a user would situate the sensor 101 in the central hole 120 as discussed above. The user would then thread the sensor 101 through the C-ring 125 until the C-ring 125 rested substantially over the seat 118. The user would then grasp the C-ring 125 at the grasping areas 126 (e.g. with pliers, or some other suitable tool), pinch the two ends of the C-ring 125 closer together, and then nestle the C-ring 125 under the seat 118—which in this embodiment is under the tapered-headed screws 119 and then release the C-ring 125 to allow it to expand and clamp the sensor 101 to the cage 103.

Likewise, when a user wishes to remove the sensor 101, he or she again would pinch the C-ring 125 together at the grasping areas 126, and then slide it from underneath the tapered headed screws 119. The sensor 101 can then be easily removed from the central hole 120 and repaired or replaced as necessary.

Using the seat 118 and securing mechanism 124 in this manner allows quick and simple placement, removal and replacement of the sensor 101. Thus, when one is faced with a faulty sensor 101, he or she need not replace the entire sensor cage assembly 100. This results in significant savings and results in less waste.

It is noted that in the present embodiment, the grasping areas 126 are two holes. However, as would be apparent to one skilled in the art, the grasping areas 126 could be any device whereby the C-ring 125 can be pinched together thereby allowing it to fit under the seat 118. For example, in some embodiments, the grasping area 126, instead of being holes, could be knobs or posts that could be grasped. In other embodiments, the grasping area could even possibly be two up-turned ends of the C-ring 125 whereby a user could pinch the C-ring 125 together with two fingers. It is also noted that in certain embodiments, the sensor 101 may come pre-equipped with a C-ring 125.

VARIATIONS OF THE ILLUSTRATED INVENTION

It is understood that the above-described arrangements are only illustrative of the application of the basic principles of the present invention. Numerous modifications and alternative arrangements may be devised by those skilled in the art without departing from the spirit and scope of the present invention. The appended claims are intended to cover such modifications and arrangements.

For example in some embodiments, the sensor 101 could be removably attached to the cage 103 by positioning the screws 119 such that an edge of the screws 119 overlapped the central hole 120 so that when the bottom edge 112 of the sensor 101 was placed on the ledge 122, the screws could be tightened down, and their edges would hold the sensor 101 in place. Then when the sensor 101 was to be removed, the screws 119 could simply be loosened or removed to allow removal of the sensor 101. One difficulty in connection with this embodiment is that the torque used when tightening the screws would have to be controlled to avoid damage to the sensor.

Another option might be a slide-in approach. For example, a half-circular ring could be built into the cage 103, with controlled space between it and the cage 103, the sensor 101 could slide into that, and a single screw 119 could clamp the sensor 101 in place. This embodiment would not provide uniform clamping force, but may be useful in some applications.

What is claimed is:

1. A removable protective device for a submersible liquid level sensor comprising:
    a) a sensor cage assembly, including a sensor component and a cage component; wherein the cage component includes a bottom plate and a top plate coupled to the bottom plate through a plurality of spacers;
    b) a seat located on a top surface of the top plate
    c) a securing mechanism capable of removably securing the sensor component in the seat.

2. The device of claim 1, wherein the seat is one or more screws situated approximately radially around a substantially central hole in the top plate.

3. The device of claim 2, wherein the screws are tapered headed screws.

4. The device of claim 1, wherein the seat is one or more items selected from the group consisting of: screws, rivets, and machined parts, situated approximately radially around a substantially central hole in the top plate.

5. The device of claim 1, wherein the securing mechanism is a C-ring.

6. The device of claim 1, wherein the top plate further includes a central hole having a ledge on which the sensor rests.

7. The device of claim 6, wherein the ledge is a continuous ridge smaller in its inner diameter than the central hole, and smaller in its inner diameter than a bottom surface of the sensor.

8. The device of claim 6, wherein the centering means is two or more outcroppings around the perimeter of the central hole.

9. A removable protective device for a submersible liquid level sensor comprising:
    a) a sensor cage assembly, including a sensor component and a cage component, wherein the cage component comprises a bottom plate and top plate coupled to the bottom plate through a plurality of spacers;
    b) a seat located on the cage component, wherein the seat is one or more screws situated approximately radially around a substantially central hole in the top plate; and
    c) a securing mechanism capable of being positioned under the one or more screws and thereby removably securing the sensor component in the seat.

10. The device of claim 9, wherein the screws are tapered headed screws.

11. The device of claim 9, wherein the securing mechanism is a C-ring.

12. The device of claim 9, wherein the top plate further includes a central hole having a ledge on which the sensor rests.

* * * * *